United States Patent [19]
Davenport et al.

[11] Patent Number: 5,341,445
[45] Date of Patent: Aug. 23, 1994

[54] POLYGONAL-SHAPED OPTICAL COUPLING MEMBER FOR USE WITH A HIGH BRIGHTNESS LIGHT SOURCE

[75] Inventors: John M. Davenport, Lyndhurst; Richard L. Hansler, Pepper Pike, both of Ohio

[73] Assignee: General Electric Company, Schenectady, N.Y.

[21] Appl. No.: 859,179

[22] Filed: Mar. 27, 1992

[51] Int. Cl.⁵ .............................................. G02B 6/26
[52] U.S. Cl. ........................................ 385/39; 385/42; 385/89; 385/93
[58] Field of Search ................... 385/39, 42, 43, 47, 385/50, 88, 89, 92, 121, 48, 93

[56] References Cited

U.S. PATENT DOCUMENTS

| | | | |
|---|---|---|---|
| Re. 33,722 | 10/1991 | Scifres et al. | 385/33 |
| 3,832,028 | 8/1974 | Kapron | 350/96 |
| 3,901,581 | 8/1975 | Thiel | 350/96 |
| 4,002,499 | 1/1977 | Winston | 136/206 |
| 4,089,583 | 5/1978 | Auracher et al. | 350/96.15 |
| 4,482,202 | 11/1984 | Nagao | 385/39 |
| 4,516,828 | 5/1985 | Steele | 350/96.16 |
| 4,744,615 | 5/1988 | Fan et al. | 350/96.10 |
| 4,784,877 | 11/1988 | Trumble | 427/163 |
| 4,807,963 | 2/1989 | Iwasaki | 350/96.24 |
| 4,900,116 | 12/1990 | Mathis | 385/48 |
| 4,910,539 | 3/1990 | Mathis et al. | 385/48 |
| 4,913,508 | 4/1990 | Blyler et al. | 385/50 |
| 4,958,263 | 9/1990 | Davenport et al. | 362/32 |
| 5,058,985 | 10/1991 | Davenport et al. | 385/115 |
| 5,059,013 | 10/1991 | Jain | 359/503 |

*Primary Examiner*—Rodney B. Bovernick
*Assistant Examiner*—Hemang Sanghavi
*Attorney, Agent, or Firm*—George E. Hawranko; Stanley C. Corwin

[57] ABSTRACT

An optical coupling assembly is useful for coupling a source of light, having high brightness and being non-coherent and focussed at a focal plane, to a plurality of optical light conductors. The coupling assembly includes an elongated light transmissive coupling member which has a central longitudinal axis and is disposed between the focal plane of the light source and leading ends of the optical light conductors. The elongated coupling member is any one of a limited number of different polygonal cross-sectional shapes. Also, the coupling member can have either a hollow tubular or a solid configuration. The hollow tubular member is coated with a highly reflective material. In one embodiment, the polygonal cross-sectional shape of the coupling member remains constant along the entire axial length of the coupling member. In another embodiment, the polygonal cross-sectional shape of the coupling member remains constant at a pair of front and rear end portions and at a middle portion disposed between them and decreases and increases along the axial length of the coupling member at front and rear transitional portions respectively disposed between the front end portion and the middle portion and between the middle portion and the rear end portion of the coupling member. The front and rear transitional portions can vary either linearly or non-linearly along their axial lengths.

32 Claims, 3 Drawing Sheets

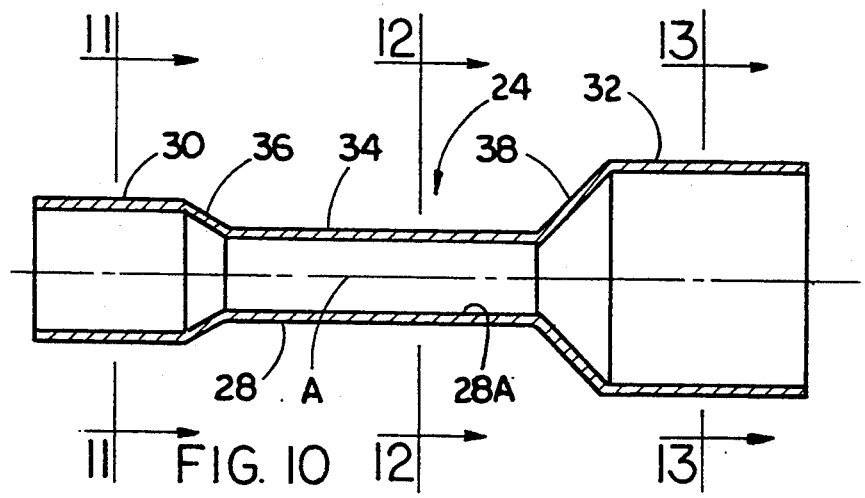
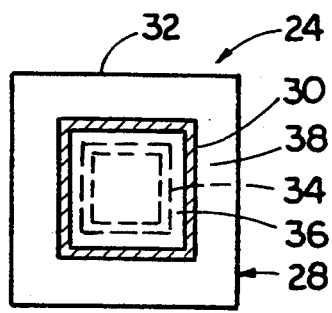 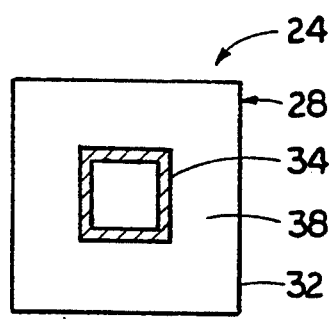 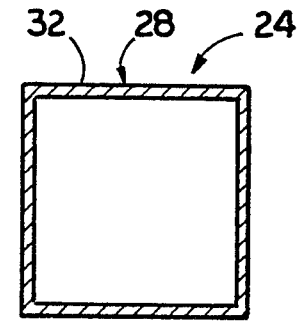
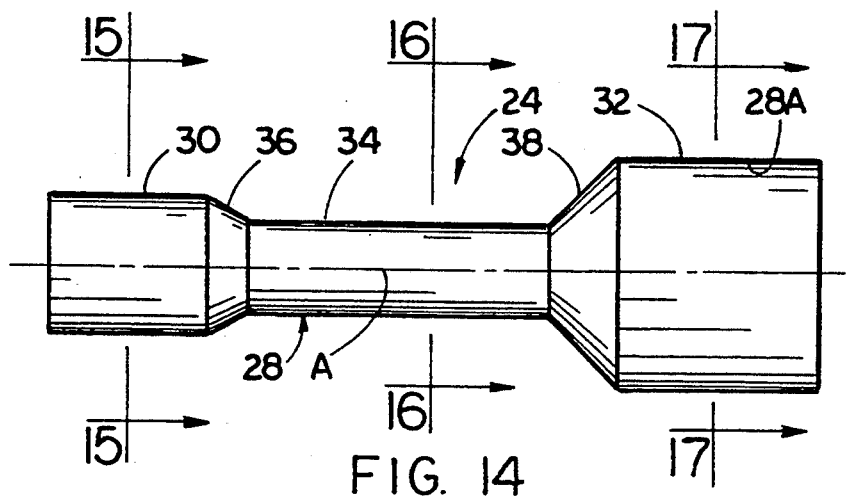
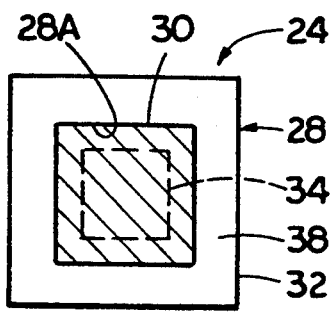 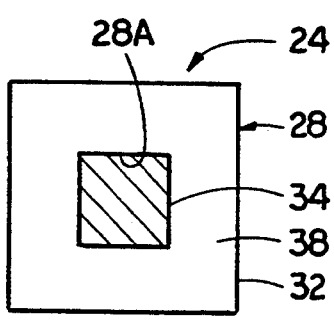 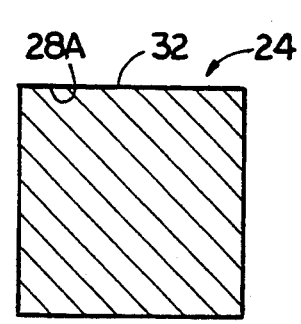

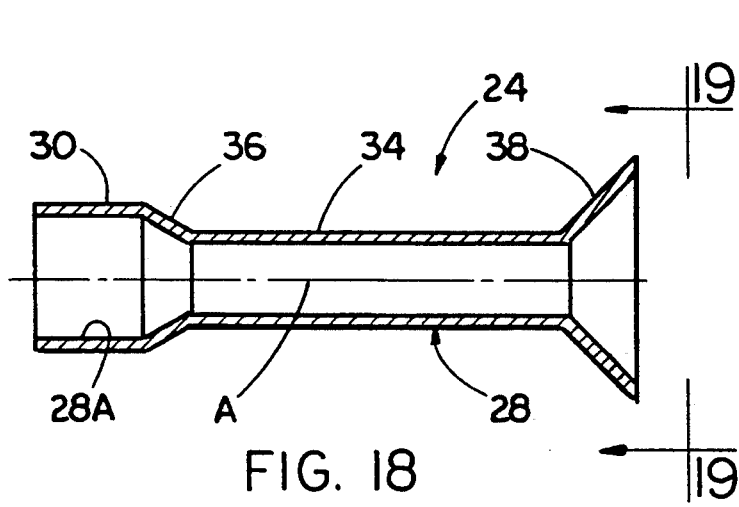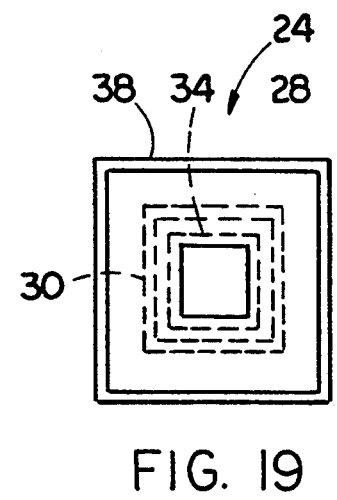
FIG. 18    FIG. 19
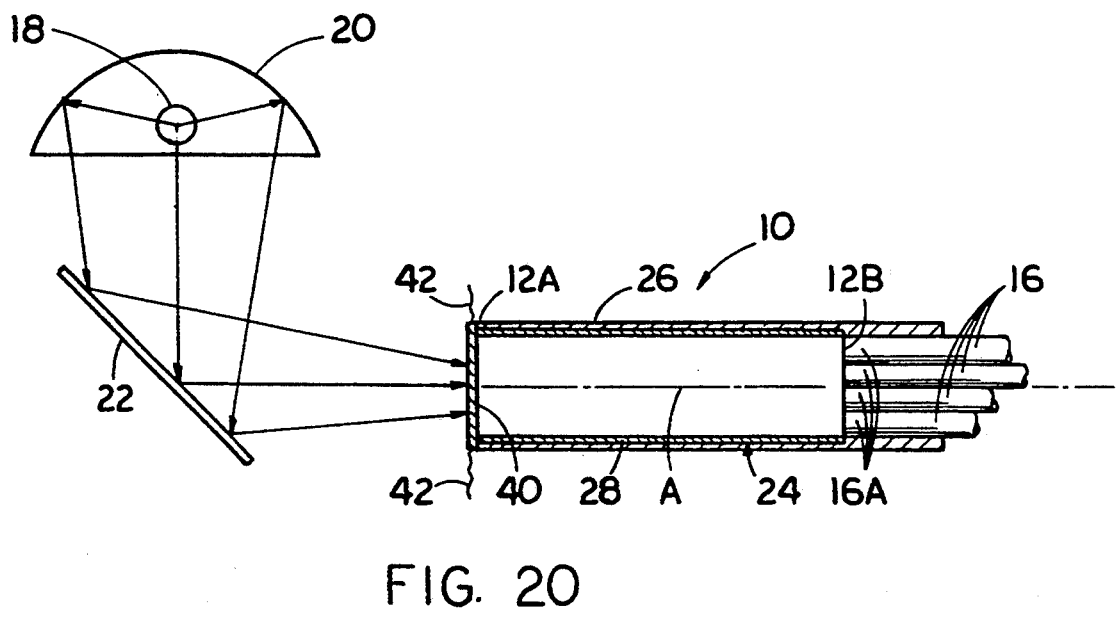
FIG. 20
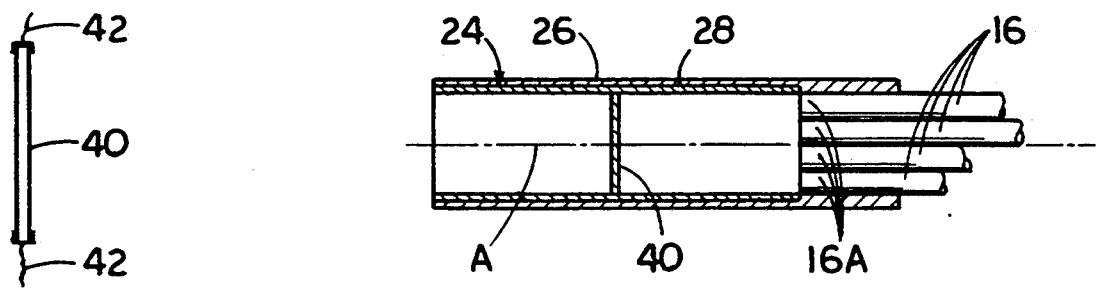
FIG. 22    FIG. 21

POLYGONAL-SHAPED OPTICAL COUPLING MEMBER FOR USE WITH A HIGH BRIGHTNESS LIGHT SOURCE

CROSS-REFERENCE TO RELATED APPLICATIONS

Reference is hereby made to the following copending U.S. patent applications dealing with related subject matter and assigned to the assignee of the present invention:

1. "Coupler Apparatus For Use With A High Brightness Light Source" by John M. Davenport et al, assigned U.S. Ser. No. 07/859,186 and filed Mar. 27, 1992.

2. "High Brightness Discharge Light Source" by Gary Allen et al, assigned U.S. Ser. No. 07/858,906 and filed Mar. 27, 1992.

3. "Reverse Flared Optical Coupling Member For Use With A High Brightness Light Source" by John M. Davenport et al, assigned U.S. Ser. No. 07/859,176 and filed Mar. 27, 1992.

4. "Optical Coupling Assembly For Use With A High Brightness Light Source" by John M. Davenport et al, assigned U.S. Ser. No. 07/859,180 and filed Mar. 27, 1992.

BACKGROUND OF THE INVENTION

1. Field of the Invention

The present invention relates generally to optical coupling of a high brightness light source to a plurality of optical light conductors and, more particularly, to a polygonal-shaped optical coupling member providing improved light mixing and thereby uniformity of light intensity and color.

2. Description of the Prior Art

Central lighting systems wherein a single light source is used to supply light output to a number of spaced apart locations using a plurality of optical light conductors, such as optical tubes, rods or fibers, have been proposed for a number of different applications including automotive, display and home lighting. For instance, U.S. Pat. No. 4,958,263 issued to Davenport et al and assigned to the same assignee as the present invention discloses the use of a central lighting system for an automotive application.

The light source for such a central lighting system must be capable of providing a light output having high brightness characteristics so as to ensure sufficient light output at the spaced apart locations. One suitable light source having a high brightness characteristic measuring in excess of 50,000 lumens per square centimeter is disclosed in the second patent application cross-referenced above. Such a light source when used in conjunction with a suitable reflector, such as one having an ellipsoidal shape, and a mirror element to focus the light output on the ends of optical fibers disposed at an optical focal plane of the reflector can produce a non-coherent high brightness focussed light output capable of causing physical damage to the ends of the optical fibers. To avoid the possible damage to the ends of the optical fibers, a light coupling member in the form of an one-piece optical cylindrical coupler rod relatively short in length is interposed between the optical focal point and the ends of the optical fibers. The light output travels through multiple internal reflections through the light coupling member from the optical focal point to the optical fibers.

Also, the non-coherent high brightness light output image produced by the light source and focussed by the ellipsoidal reflector tends to be brightest and more blue in color at the center of the light output and dimmer and more red in color around the outer edge of the light output. When the light output enters the cylindrical optical coupling member, the multiple internal reflections tend to achieve some mixing of the light and thereby reducing the differences in intensity and color from the outer edge to the center of the light output entering the optical fibers.

Although some mixing of the intensity and color of the light occurs as the light travels through the cylindrical coupling member, there is still a tendency for a bright spot to occur along the longitudinal axis of the cylindrical coupling member. The red light originating in the discharge plume of the lamp and tending to occur at the outer edge of the image at the focus of the ellipsoidal reflector tends to remain near the outer surface about the circumference of the cylindrical coupling member. Therefore, a need remains for improvement of the design of optical coupling member so as to reduce the tendency for the bright spot to occur along the longitudinal axis of the coupling member by increasing light intensity and color mixing.

SUMMARY OF THE INVENTION

The present invention provides a polygonal-shaped optical coupling member designed to satisfy the aforementioned needs. The polygonal-shaped optical coupling member of the present invention provides an increased number of internal reflections per unit length which achieves a more uniform distribution of the light intensity and improved color mixing over that achieved by a cylindrical tubular coupling member of greater axial length.

Accordingly, the present invention is directed to an optical coupling member for use in coupling non-coherent light from a source focussed at a focal plane to a plurality of optical light conductors. The coupling member comprises an elongated light transmissive body having a central longitudinal axis and being disposed between the focal point of the light source and leading ends of the plurality of optical light conductors. The elongated body has a cross-sectional shape selected only from a group of different polygonal shapes for providing improved uniformity of light intensity distribution and mixing of light color. The group of different polygonal shapes include rectangular, square, triangular and hexagonal shapes. Also, the elongated body can have either a hollow tubular or a solid configuration. The hollow tubular member is coated with a highly reflective material.

In one embodiment of the coupling member, the polygonal cross-sectional shape of the elongated body remains constant in size along the entire axial length of the coupling member. In another embodiment of the coupling member, the polygonal cross-sectional shape of the elongated body remains constant along the axial lengths of a pair of front and rear end portions and a middle portion disposed between them and decreases and increases along the axial length of the coupling member at front and rear transitional portions respectively disposed between the front end portion and the middle portion and between the middle portion and the rear end portion of the coupling member. The front and rear transitional portions can vary either linearly or non-linearly along their axial lengths. The cross-sectional size of the middle portion is less than the respective cross-sectional sizes of the front and rear end portions. Also, the rear end portion has a greater axial length and greater cross-sectional size than the front end portion of the elongated body.

Also, the present invention is directed to an optical lighting system which includes a non-coherent high brightness source of light, being focussed at the focal plane, a plurality of optical light conductors, and an optical coupling assembly. The optical coupling assembly comprises the above-defined coupling member and means for retaining the coupling member in coupling relationship with the leading ends of the light conductors.

These and other features and advantages and attainments of the present invention will become apparent to those skilled in the art upon a reading of the following detailed description, when taken in conjunction with the drawings, wherein there is shown and described an illustrative embodiment of the invention.

BRIEF DESCRIPTION OF THE DRAWINGS

In the following detailed description, wherein like reference characters designate like or corresponding parts throughout the several views, reference will be made to the attached drawings in which:

FIG. 10 is an enlarged longitudinal sectional view of a second embodiment of the optical coupling member in which it is an elongated hollow tubular body of a square cross-sectional shape varying along the axial length of the coupling member.

FIG. 11 is a cross-sectional view of a front end portion of the coupling member taken along line 11—11 of FIG. 10.

FIG. 12 is a cross-sectional view of a middle portion of the coupling member taken along line 12—12 of FIG. 10.

FIG. 13 is a cross-sectional view of a rear end portion of the coupling member taken along line 13—13 taken along line 13—13 of FIG. 10.

FIG. 14 is a view similar to that of FIG. 10, but showing a modified form of the second embodiment of the optical coupling member in which it is an elongated solid body of the square cross-sectional shape varying along the axial length of the coupling member.

FIG. 15 is a cross-sectional view of a front end portion of the coupling member taken along line 15—15 of FIG. 14

FIG. 16 is a cross-sectional view of a middle portion of the coupling member taken along line 16—16 of FIG. 14.

FIG. 17 is a cross-sectional view of a rear end portion of the coupling member taken along line 17—17 of FIG. 14.

FIG. 18 is a view similar to that of FIG. 10, but showing another modified form of the second embodiment of the optical coupling member.

FIG. 19 is a rear elevational end view of the optical member taken along line 19—19 of FIG. 18.

FIG. 20 is a view similar to that of FIG. 1 also showing a liquid crystal dimmer device placed at an input end of the polygonal-shaped optical coupling member of the coupling assembly of the present invention.

FIG. 21 is a view similar to that of FIG. 20 but showing the dimmer device placed within the optical coupling member at about the mid-point of its axial length.

FIG. 22 is a side elevational view of the dimmer device by itself.

DETAILED DESCRIPTION OF THE INVENTION

Figure 1:
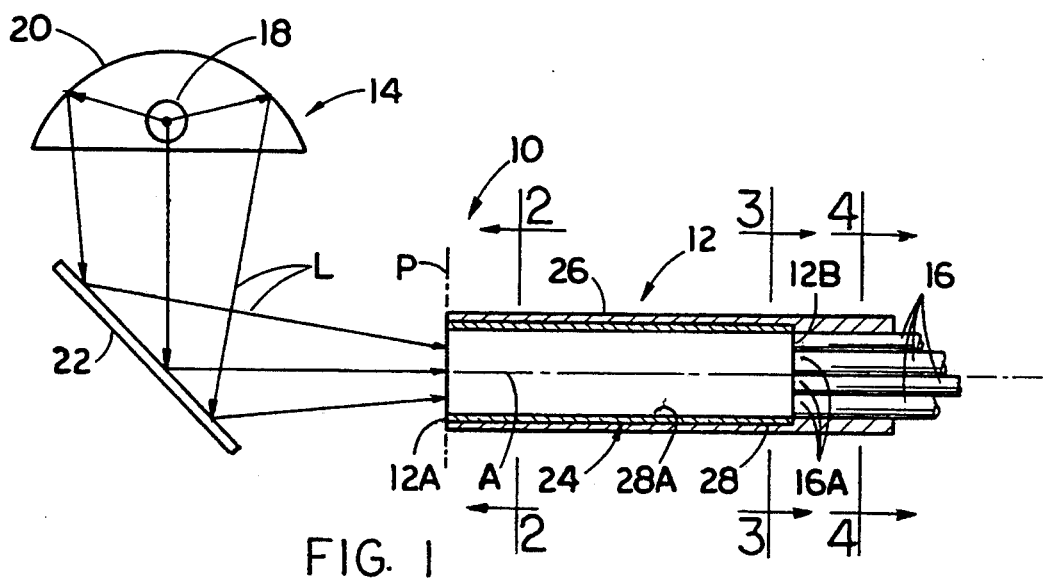
FIG. 1 is a longitudinal elevational view partly in section of an optical coupling assembly of the present invention having an optical coupling member for optically coupling a high brightness focussed light source to a plurality of optical light conductors, the optical coupling member in a first embodiment being an elongated hollow tubular body of any one of a limited number of different polygonal cross-sectional shapes that remain constant along the axial length of the coupling member.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Referring now to the drawings, and particularly to FIGS. 1-4, there is illustrated an optical lighting system, generally designated 10, which includes an optical coupling assembly 12 of the present invention interfacing or coupling a source of light 14 with leading ends 16A of a plurality of optical light conductors 16 of the lighting system 10. Preferably, although not necessarily, the source of light 14 includes a lamp 18 capable of generating a non-coherent high brightness light output L, a reflector element 20, such as one having an ellipsoidal shape, and a mirror element 22, such as one having a planar shape, which together are operable to generate, and arranged to focus, an image of the non-coherent high brightness light output L at an optical focal plane P located at an input end 12A of the optical coupling assembly 12. The term "high brightness" refers to any light source with an output of approximately 50,000 lumens per square centimeter effective brightness, however, the subject invention is not limited to a high brightness light source and is equally applicable to any brightness light source. A suitable light source 14 which can be employed in the lighting system 10 is the one disclosed in the second patent application cross-referenced above, the disclosure of which is incorporated herein by reference thereto.

Referring to FIGS. 1–4, the optical coupling assembly 12 basically includes an elongated optical coupling member 24 having a central longitudinal axis A and being disposed between the light source 14 and the leading ends 16A of the optical light conductors 16, and means 26 for retaining the coupling member 24 in an optically coupled relationship with the leading ends 16A of the light conductors 16. The optical coupling member 24 is an elongated light transmissive body 28 having any one of a limited number of different polygonal cross-sectional shapes in accordance with the present invention for providing improved uniformity of light intensity distribution and mixing of light color. The coupling member 24 is constructed of a suitable light transmissive material such as quartz or a suitable plastic.

In the illustrated embodiment, the retaining means 26 is a hollow sleeve-shaped member capable of receiving and holding the coupling member 24 and the leading ends 16A of the light conductors 16 in an optically coupled relationship with each other. A suitable retaining means 26 which can be employed in the optical coupling assembly 12 is the one disclosed in the first patent application cross-referenced above, the disclosure of which is incorporated herein by reference thereto. As an alternative, the leading ends 16A of the light conductors 16 can be adhered to the output end of the coupling member 24 by the application of a suitable adhesive between the adjacent faces thereof in the embodiments wherein the coupling member 24 is of a solid configuration. As an alternative embodiment, with respect to the hollow tubular configuration of the coupling member 24 as described hereafter, the light source 14 and the leading ends 16A of the optical light conductors 16 can be placed within the opposite ends of the coupler member 24, thereby eliminating the need for a separate retaining member 26.

Figure 6:
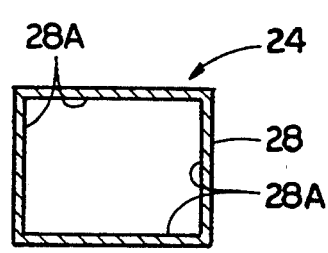
FIG. 6 is a view similar to that of FIG. 5, but showing the optical coupling member having a rectangular cross-sectional shape.
Figure 7:
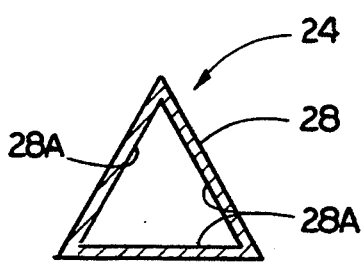
FIG. 7 is a view similar to that of FIG. 5, but showing the optical coupling member having a triangular cross-sectional shape.
Figure 8:
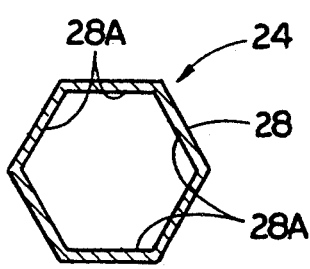
FIG. 8 is a view similar to that of FIG. 5, but showing the optical coupling member having a hexagonal cross-sectional shape.
Figure 9:
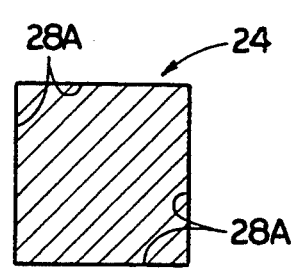
FIG. 9 is a view similar to that of FIG. 5, but showing the optical coupling member having a solid body with a square cross-sectional shape.

Referring to FIGS. 1–9, in a first embodiment of the optical coupling member 24, the polygonal cross-section of the elongated body 28 preferably remains constant in shape and size throughout the entire length of the coupling member 24 measured along the longitudinal axis A thereof, however, it is to be understood that the subject invention includes other embodiments wherein the polygonal cross-section of the elongated body 28 increases in shape and size from one of its ends to its other end along the longitudinal axis thereof. The elongated body 28 can have the different cross-sectional shapes and a hollow tubular configuration, as shown in FIGS. 5–8, or a solid configuration, as shown in FIG. 9. The hollow tubular configuration of the elongated body 28 can be constructed by using planar mirrors being the same in number as the sides of the polygonal shape. The internal surfaces 28A of the elongated tubular body 28 are preferably coated with a highly reflective material. The solid configuration of the elongated body 28 will have optically reflective internal side surfaces 28A the same in number as the sides of the polygonal shape. The different polygonal cross-sectional shapes of the elongated body 28 which are desirable to use are ones selected from the following group: square, as illustrated in FIGS. 2–5 and 9; rectangular, as illustrated in FIG. 6; triangular, as illustrated in FIG. 7; pentagonal, not shown; and hexagonal, as illustrated in FIG. 8. The reason why the choice of different polygonal shapes to be used are limited to the ones in this group is because polygonal shapes having greater numbers of sides than the hexagonal shape have a tendency, being similar to that of the cylindrical shape, to focus a bright spot of light along the longitudinal axis A which persists in the light at the output end of the optical coupling assembly 12B.

Referring to FIGS. 10–17, in a second embodiment of the optical coupling member 24, the elongated body 28 includes a pair of front and rear end portions 30, 32 and a middle portion 34 disposed between the front and rear end portions 30, 32. The polygonal cross-sectional shapes of the front and rear end portions 30, 32 and middle portion 34 are disposed symmetrical about the longitudinal axis A and preferably remain constant along their respective axial lengths taken along the longitudinal axis A of the body 28. Also, the polygonal cross-sectional shapes of the front and rear end portions 30, 32 have respective sizes being greater than the size of the polygonal cross-sectional shape of the middle portion 34. Further, the polygonal cross-sectional shape of the rear end portion 32 is preferably of a size greater than the size of the polygonal cross-sectional shape of the front end portion 30. Still further, the rear end portion 32 has a greater axial length than the front end portion 30 as measured along the longitudinal axis A.

Also, the elongated body 28 includes front and rear transitional portions 36, 38. The front transitional portion 36 is disposed between and connected to the front end and middle portions 30, 34. The polygonal cross-sectional shape of the front transitional portion 36 decreases in size along the longitudinal axis A from the front end portion 30 to the middle portion 34. The rear transitional portion 38 is disposed between and connected to the middle and rear end portions 34, 32. The polygonal cross-sectional shape of the rear transitional portion 38 increases in size along the longitudinal axis A from the middle portion 34 to the rear end portion 32. The front and rear transitional portions 36, 38 can have opposite reverse oriented tapered configurations, as seen in FIGS. 10 and 14, which vary linearly along the longitudinal axis A. Alternatively, the front and rear transitional portions 36, 38 can have opposite or reverse oriented parabolic configurations (or compound parabolic configurations), which vary non-linearly along the longitudinal axis A. It should be understood that the tapered configurations of the front and rear transitional portions 36, 38 can be different from each other and need not be of the same slope or curvature.

As in the first embodiment of FIGS. 1–9, the elongated body 28 of the second embodiment of FIGS. 10–17 can have any of the different polygonal cross-sectional shapes, namely, square, rectangular, triangular and hexagonal shapes, or a pentagonal shape (not shown). Also, the elongated body 28 can have a hollow tubular configuration, as seen in FIGS. 10–13 and 18, with the internal surfaces 28A thereof coated with a highly reflective material for reflecting light. Or, the elongated body 28 can have a solid configuration, as seen in FIGS. 14–17. The embodiment seen in FIGS. 18 and 19 is identical to the embodiment shown in FIG. 10 except that the rear end portion 32 has been omitted therefrom.

With the elongated body 28 of the coupling member 24 having the configuration of any of the above-described embodiments, it is readily apparent that the number of internal reflections per unit length are thereby substantially increased over that in the case of a cylindrical coupling member. It is believed that the multitude of flat reflective surfaces in the elongated body 28 causes increased mixing of the outer and central portions of the light so as to substantially reduce the color differences to a point where they are not noticeable at the output end 12B of the coupling assembly 12.

Figure 2:
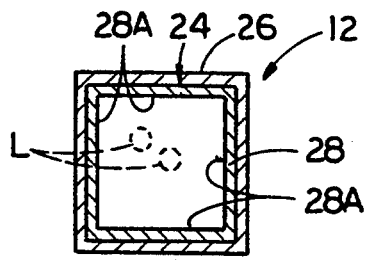
FIG. 2 is an enlarged cross-sectional view of the coupling assembly taken along line 2—2 of FIG. 1, showing the optical coupling member having a square cross-sectional shape.
Figure 3:
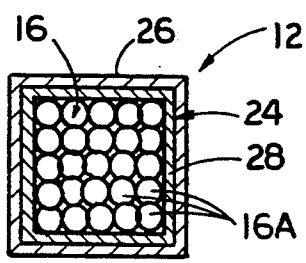
FIG. 3 is another enlarged cross-sectional view of the coupling assembly taken along line 3—3 of FIG. 1.
Figure 4:
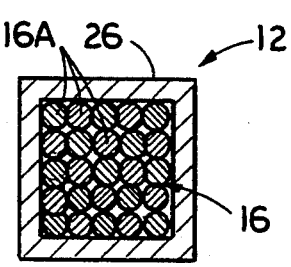
FIG. 4 is still another enlarged cross-sectional view of the coupling assembly taken along line 4—4 of FIG. 1.
Figure 5:
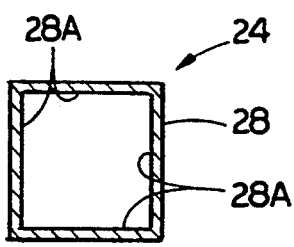
FIG. 5 is a view similar to that of FIG. 2, but showing only the optical coupling member.

It has been found that a coupling member 24 having a square (rectangular) cross-sectional shape improves mixing over a relatively short length, that is, a small length to cross-section dimension ratio. As a specific example, it has been found that a 6 inch length of a coupling member having a square cross-sectional shape of 1.125 by 1.125 square inches produces very uniform intensity and color over the entire output aperture. This is true for almost any position of the input light L which is concentrated in an approximately 0.75 inch diameter spot, whether located symmetrically about the longitudinal axis A or offset to one side thereof as shown in FIG. 2.

Referring to FIGS. 20-22, there is shown a light dimmer device 40, such as a liquid crystal type dimmer device, mounted across the interior of the optical coupling member 24 to intersect the light to be transmitted through the member 24. In FIG. 20, the liquid crystal dimmer device 40 is placed across an input end 12A of the polygonal-shaped optical coupling member 24. In FIG. 21, the liquid crystal dimmer device 40 is placed within and across the interior of the coupling member 24 at about the mid-point of its axial length. The dimmer device 40 has a pair of electrical lead wires 42 for connecting it to a suitable power supply and control device (not shown) for energizing the dimmer device 40 with electrical energy. When the liquid crystals are energized, they align and assume a transparent state permitting light to pass through the dimmer device 40. As the electrical energy is reduced, the liquid crystals become less energized and change to a translucent milky state reducing the amount of light that can pass through the dimmer device 40. Alternatively, it is possible to use a mechanical dimmer device 40, such as a camera iris, at the input end 12A of the coupling member 24.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

We claim:

1. An optical coupling member for use in coupling non-coherent light from a source of light to a plurality of optical light conductors, said coupling member comprising:
   (a) an elongated light transmissive body having a central longitudinal axis and being disposable between the light source and leading ends of the plurality of optical light conductors;
   (b) said elongated body also having a cross-sectional shape selected only from a group of different polygonal shapes for providing improved uniformity of light intensity distribution and mixing of light color of such non-coherent light; and,
   (c) wherein said group of different polygonal shapes includes rectangular, square, triangular and hexagonal shapes.

2. The coupling member as recited in claim 1, wherein said elongated body has a solid configuration.

3. The coupling member as recited in claim 1, wherein said elongated body has a hollow tubular configuration.

4. The coupling member as recited in claim 3, wherein said elongated body is coated internally with a highly reflective material.

5. An optical coupling member for use in coupling a source of light to a plurality of optical light conductors, said coupling member comprising:
   (a) an elongated light transmissive body having a central longitudinal axis and being disposable between the light source and leading ends of the plurality of optical light conductors;
   (b) said elongated body also having a cross-sectional shape selected only from a group of different polygonal shapes for providing improved uniformity of light intensity distribution and mixing of light color;
   (c) said elongated body including a pair of front and rear end portions and a middle portion disposed between said front and rear end portions, said polygonal cross-sectional shapes of said front and rear end portions having respective sizes being greater than the size of said polygonal cross-sectional shape of said middle portion.

6. The coupling member as recited in claim 5, wherein said polygonal cross-sectional shapes of said front and rear end portions and middle portion remain constant along said longitudinal axis.

7. The coupling member as recited in claim 5, wherein said elongated body also includes:
   a front transitional portion disposed between and connected to said front end and middle portions, said polygonal cross-sectional shape of said front transitional portion decreasing in size along said longitudinal axis from said front end portion to said middle portion; and
   a rear transitional portion disposed between and connected to said middle and rear end portions, said polygonal cross-sectional shape of said rear transitional portion increasing in size along said longitudinal axis from said middle portion to said rear end portion.

8. The coupling member as recited in claim 7, wherein said front and rear transitional portions vary linearly along said longitudinal axis.

9. The coupling member as recited in claim 7, wherein said front and rear transitional portions vary non-linearly along said longitudinal axis.

10. The coupling member as recited in claim 5, wherein said polygonal cross-sectional shape of said rear end portion is of a size greater than the size of said polygonal cross-sectional shape of said front end portion.

11. The coupling member as recited in claim 5, wherein said rear end portion has a greater length than said front end portion as measured along said longitudinal axis.

12. The coupling member as recited in claim 5, wherein said group of different polygonal shapes includes rectangular, square, triangular and hexagonal shapes.

13. The coupling member as recited in claim 5, wherein said elongated body has a solid configuration.

14. The coupling member as recited in claim 5, wherein said elongated body has a hollow tubular configuration.

15. The coupling member as recited in claim 14, wherein said elongated body is coated internally with a highly reflective material.

16. An optical coupling member for use in coupling a source of light to a plurality of optical light conductors, said coupling member comprising:
(a) an elongated light transmissive body having a central longitudinal axis and being disposable between the light source and leading ends of the plurality of optical light conductors;
(b) said elongated body also having a cross-sectional shape selected only from a group of different polygonal shapes for providing improved uniformity of light intensity distribution and mixing of light color;
(c) said elongated body including a pair of front and rear transitional portions and a middle portion disposed between said front and rear transitional portions, said polygonal cross-sectional shapes of said front and rear transitional portions having respective sizes being greater than the size of said polygonal cross-sectional shape of said middle portion.

17. The coupling member as recited in claim 16, wherein said polygonal cross-sectional shape of said front transitional portion increases in size along said longitudinal axis from said middle portion toward said light source and said polygonal cross-sectional shape of said rear transitional portion increases in size along said longitudinal axis from said middle portion toward said optical light conductors.

18. The coupling member as recited in claim 16, wherein said front and rear transitional portions taper in opposite directions from said middle portion.

19. The coupling member as recited in claim 16, further comprising an end portion connected to at least one of said front and rear transitional portions.

20. The coupling member as recited in claim 16, further comprising an end portion connected to each of said front and rear transitional portions, said polygonal cross-sectional shape of said end portion having a size greater than the size of said polygonal cross-sectional shape of said middle portion.

21. In an optical lighting system including a non-coherent source of light and a plurality of optical light conductors, an optical coupling assembly comprising:
(a) an elongated light transmissive coupling member having a central longitudinal axis and being disposable between the light source and leading ends of the plurality of optical light conductors, said leading ends having a combined surface area associated therewith;
(b) retaining member effective so as to retain said coupling member in an optically coupled relationship with said leading ends of said light conductors;
(c) said coupling member also having a cross-sectional shape selected only from a group of different polygonal shapes for providing improved uniformity of light intensity distribution and mixing of light color across said combined surface area of said leading ends; and
(d) wherein said group of different polygonal shapes includes rectangular, square, triangular and hexagonal shapes.

22. The lighting system as recited in claim 21, wherein said elongated body has a solid configuration.

23. The lighting system as recited in claim 21, wherein said elongated body has a hollow tubular configuration.

24. The lighting system as recited in claim 23, wherein said elongated body is coated internally with a highly reflective material.

25. The lighting system as recited in claim 21, wherein said light source includes:
a lamp capable of generating the non-coherent light output;
a reflector element having an ellipsoidal shape; and
a mirror element having a planar shape, said lamp, reflector element and mirror element together being operable to generate, and being arranged to direct, an image of the non-coherent light output to an input end of said optical coupling assembly.

26. The lighting system as recited in claim 21, wherein said retaining means is a hollow sleeve-shaped member capable of receiving and holding said elongated member and said leading ends of the light conductors in optically coupled relationship with one another.

27. The lighting system as recited in claim 21, wherein said elongated body includes a pair of front and rear end portions and a middle portion disposed between said front and rear end portions, said polygonal cross-sectional shapes of said front and rear end portions and middle portion remaining constant along said longitudinal axis, said polygonal cross-sectional shapes of said front and rear end portions having respective sizes being greater than the size of said polygonal cross-sectional shape of said middle portion.

28. The lighting system as recited in claim 27, wherein said elongated body also includes:
a front transitional portion disposed between and connected to said front end and middle portions, said polygonal cross-sectional shape of said front transitional portion decreasing in size along said longitudinal axis from said front end portion to said middle portion; and
a rear transitional portion disposed between and connected to said middle and rear end portions, said polygonal cross-sectional shape of said rear transitional portion increasing in size along said longitudinal axis from said middle portion to said rear end portion.

29. The lighting system as recited in claim 28, wherein said front and rear transitional portions vary linearly along said longitudinal axis.

30. The lighting system as recited in claim 28, wherein said front and rear transitional portions vary non-linearly along said longitudinal axis.

31. The lighting system as recited in claim 21, further comprising dimmer means positioned at one end of a pair of opposite ends of said elongated light transmissive coupling member and operable for controlling the intensity of light passing through said coupling member from said light source to said optical light conductors.

32. The lighting system as recited in claim 21, further comprising dimmer means disposed across and positioned internally between the opposite ends of said elongated light transmissive coupling member and operable for controlling the intensity of light passing through said coupling member from said light source to said optical light conductors.

* * * * *